US008056890B2

(12) United States Patent
Engel

(10) Patent No.: US 8,056,890 B2
(45) Date of Patent: Nov. 15, 2011

(54) CUT MAT

(76) Inventor: William Thomas Engel, Oakdale, PA (US)

( * ) Notice: Subject to any disclaimer, the term of this patent is extended or adjusted under 35 U.S.C. 154(b) by 627 days.

(21) Appl. No.: 12/214,765

(22) Filed: Jun. 23, 2008

(65) Prior Publication Data

US 2011/0101589 A1 May 5, 2011

Related U.S. Application Data

(60) Provisional application No. 60/958,091, filed on Jul. 2, 2007.

(51) Int. Cl.
*B23Q 3/00* (2006.01)

(52) U.S. Cl. ................. 269/296; 269/289 R; 269/302.1; 29/281.1

(58) Field of Classification Search .............. 269/289 R, 269/302.1, 95, 900; 29/281.1
See application file for complete search history.

(56) References Cited

U.S. PATENT DOCUMENTS

| | | | | |
|---|---|---|---|---|
| 3,016,317 | A * | 1/1962 | Brunner | 428/138 |
| 3,636,577 | A * | 1/1972 | Nissen | 5/420 |
| 4,956,199 | A * | 9/1990 | Ruisi | 427/173 |
| 4,989,846 | A * | 2/1991 | Quinn | 269/54.5 |
| 6,859,960 | B1 * | 3/2005 | Jerome | 5/413 R |
| 7,485,071 | B2 * | 2/2009 | Edwards | 482/23 |
| 2005/0192158 | A1 * | 9/2005 | Edwards | 482/23 |
| 2009/0011911 | A1 * | 1/2009 | Lee | 482/142 |
| 2011/0101589 | A1 * | 5/2011 | Engel | 269/296 |

* cited by examiner

*Primary Examiner* — Lee D Wilson

(57) ABSTRACT

A portable cutting mat for improving safety when using a power circular saw for cutting wood sheeting. The mat has a top surface, bottom surface, top edge, bottom edge, left edge, and right edge. The mat also contains holes through the top and bottom surfaces in a predetermined grid pattern. Disposed and secured within the mat holes are replaceable support pegs of a predetermined height. A wood sheet is to be laid on top of replaceable support pegs so that the top, bottom, left, and right edges along with row markings are visible around the perimeter of the wood sheet. The row markings are contrasting colors of alternate rows of the replaceable support pegs and/or alternate row markings directly printed on the mat to differentiate between rows of the replaceable support pegs. Cutting channels are the open areas between the rows of the replaceable support pegs, and the top surface of mat. Tie strings and/or straps are attached to the top or bottom edge to secure around the circumference of rolled up mat for transportation or storage.

8 Claims, 2 Drawing Sheets

Fig. 2
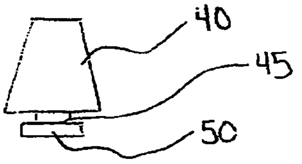
Fig. 3
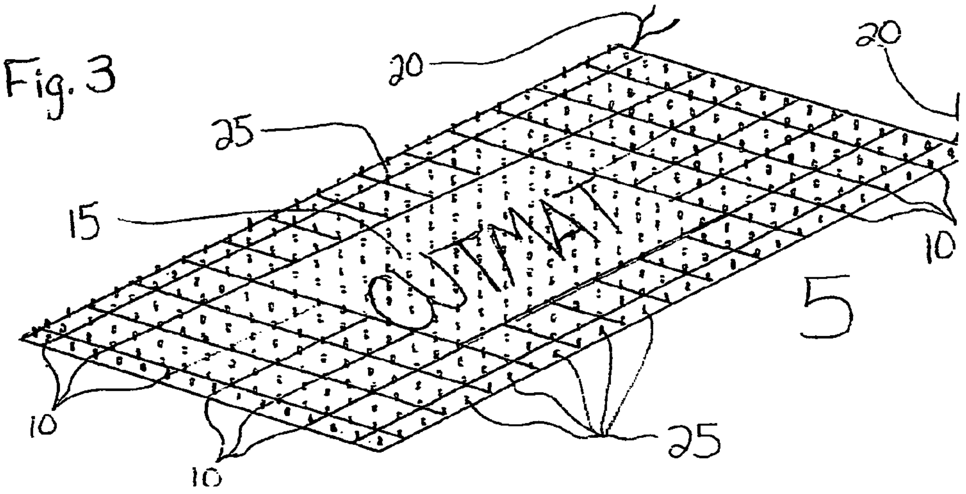
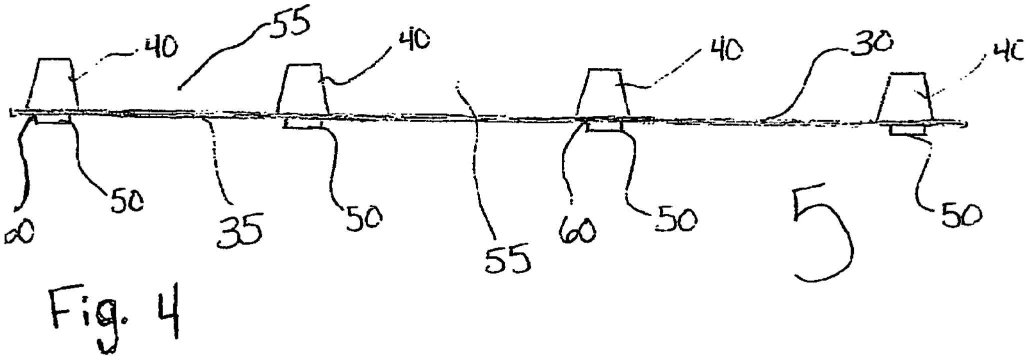
Fig. 4

CUT MAT

CROSS REFERENCE TO RELATED APPLICATION

This application claims priority to provisional application No. 60/958,091 filed on Jul. 2, 2007

U.S. PATENTS SEARCHED

U.S. Pat. No. 3,677,123 Jul. 18, 1972
U.S. Pat. No. 3,866,496 Feb. 18, 1975
U.S. Pat. No. 3,942,781 Mar. 9, 1976
U.S. Pat. No. 4,128,029 Dec. 5, 1978
U.S. Pat. No. 4,133,360 Jan. 9, 1979
U.S. Pat. No. 4,197,775 Apr. 15, 1980
U.S. Pat. No. 4,327,619 May 4, 1982
U.S. Pat. No. 4,335,765 Jun. 22, 1982
U.S. Pat. No. 4,570,915 Feb. 18, 1986
U.S. Pat. No. 4,860,807 Aug. 29, 1989
U.S. Pat. No. 4,884,791 Dec. 5, 1989
U.S. Pat. No. 4,974,651 Dec. 4, 1990
U.S. Pat. No. 5,144,994 Sep. 8, 1992

BACKGROUND OF INVENTION

I. Field of the Invention

This invention pertains to a cutting mat. More specifically, the invention concerns a portable cutting mat which when rolled out on a flat surface is marginally larger than a standard four foot by eight foot wood sheet. Said mat contains replaceable support pegs set in a grid pattern of predetermined spacing to support said wood sheet above the mats top surface and create cutting channels beneath said wood sheet and between rows of said replaceable support pegs for use in cutting said wood sheet with a power circular saw. This grid system of said replaceable support pegs allows the user to put their full weight upon the wood sheet while cutting without fear of binding or stopping the blade of said circular saw, thus creating a safer way to cut said wood sheeting.

II. Description of the Prior Art

U.S. Pat. No. 3,677,123 issued Jul. 18, 1972 teaches a penetrable bed used for cutting cloth sheet goods. The cloth material is held up by a bristle bed. As the blade cuts through the material it makes contact with the flexible bristles and pushes them to either side of the cutting blade without damaging the bristles. A disadvantage is that the bristle bed is a part of a large stationary cutting machine which would not be portable. Yet another disadvantage is that in order for the bristles to be flexible they do not have enough strength to hold heavier wood materials and also would not allow the full weight of the user to be on top of the wood material as it is being cut.

Another cutting table U.S. Pat. No. 5,144,994 issued Sep. 8, 1992 teaches a portable rigid saw table. The saw table has two parallel beams with notches to accept cross pieces of scrap wood or other material. The material to be cut is laid on top of the crosspieces and as the blade of the saw cuts through the material it also cuts through the cross pieces which then need to be replaced. A disadvantage is the wasteful cutting of cross pieces which makes the saw work harder and further dulls the saws blade by cutting through unnecessary material. Yet another disadvantage is that being rigid would make it cumbersome to carry around. Yet another disadvantage is that it is a table and would not be safe for the user to put their full weight on top of the material to immobilize said material while it is being cut.

None of the prior art teaches an improved cutting mat in which user safety is achieved by securing the wood material being cut to the cutting mat by standing on said wood material. Thus using the full weight of the user to immobilize said wood material during the cutting process. Also, none of the prior art teaches an improved cutting mat in which none of it's parts are designed to come in contact with the cutting blade thus making the saw more efficient and also help the saw blade last longer. Also none of the prior art shows an improved cutting mat that is made of light weight material that can be rolled up and easily carried to the job site or stored.

Thus it is the intent of the present invention to provide a cutting mat in which safety is achieved by using the full weight of the user to immobilize and secure the wood material being cut by standing on top of said material. It is also the intent of the present invention to provide a cutting mat in which cutting channels between rows of replaceable support pegs are designed to eliminate contact of anything except the material to be cut thus improving efficiency of the saw and longevity of the saw blade. It is also the intent of the present invention to provide a wood sheet cutting mat which is portable and light weight allowing said mat to be rolled up when not in use for easy storage or transportability.

SUMMARY OF INVENTION

The present invention is a portable cutting mat for improving safety when using a power circular saw for cutting wood sheeting. Said portable cutting mat when rolled out on a flat surface is marginally larger than a standard four foot by eight foot wood sheet. Said portable cutting mat contains holes punched through said mat in a grid pattern of predetermined spacing. Replaceable support pegs made to be secured within said holes of mat would enable said mat and replaceable support pegs when rolled out on a flat surface to support said wood sheet above said mat surface by only contacting said replaceable support pegs thus enabling to support the full weight of user on top of said wood sheet to secure and immobilize said wood sheet while cutting without fear of bending or binding the blade of said circular saw. Contrasting colors of every other row of said replaceable support pegs and/or contrasting markings on said mat would enable user to differentiate between said rows. Said row markings would be printed along the outer perimeter of said mat allowing center section to be used as a logo area to customize said mat with a company or product name. The area between rows of said replaceable support pegs would be used as a cutting channel of said wood sheet with said circular saw. Said circular saw blade would be set a predetermined depth of cut as to cut through said wood sheet but not make contact with said mat at the bottom of said cutting channel. Aligning cut marks of said wood sheet directly over said cutting channels would allow said wood sheet to be cut without contacting said replaceable support pegs. Ties and/or straps attached to the bottom or top edge of said mat would secure said mat by wrapping and/or tying around the circumference of said mat when it is rolled up and not in use.

NUMERICAL INDEX FOR DRAWINGS

5. Cut Mat
10. Row Markings
15. Logo Area
20. Tie Strings
25. Replaceable Support Pegs
30. Mat Top Surface
35. Mat Bottom Surface
40. Top Section of Replaceable Support Peg
45. Mat Grove of Replaceable Support Peg
50. Bottom Section of Replaceable Support Peg
55. Cutting Channel
60. Mat Holes
65. Top Edge 70. Bottom Edge
75. Left Edge
80. Right Edge

BRIEF DESCRIPTION OF DRAWINGS

This invention comprises the parts, devices and arrangements of the invention hereinafter described, by way of example, and illustrated in the accompanying drawings of a preferred embodiment in which:

FIG. 2 is a side view of two different versions of the present inventions replaceable support pegs.

Figure 1:
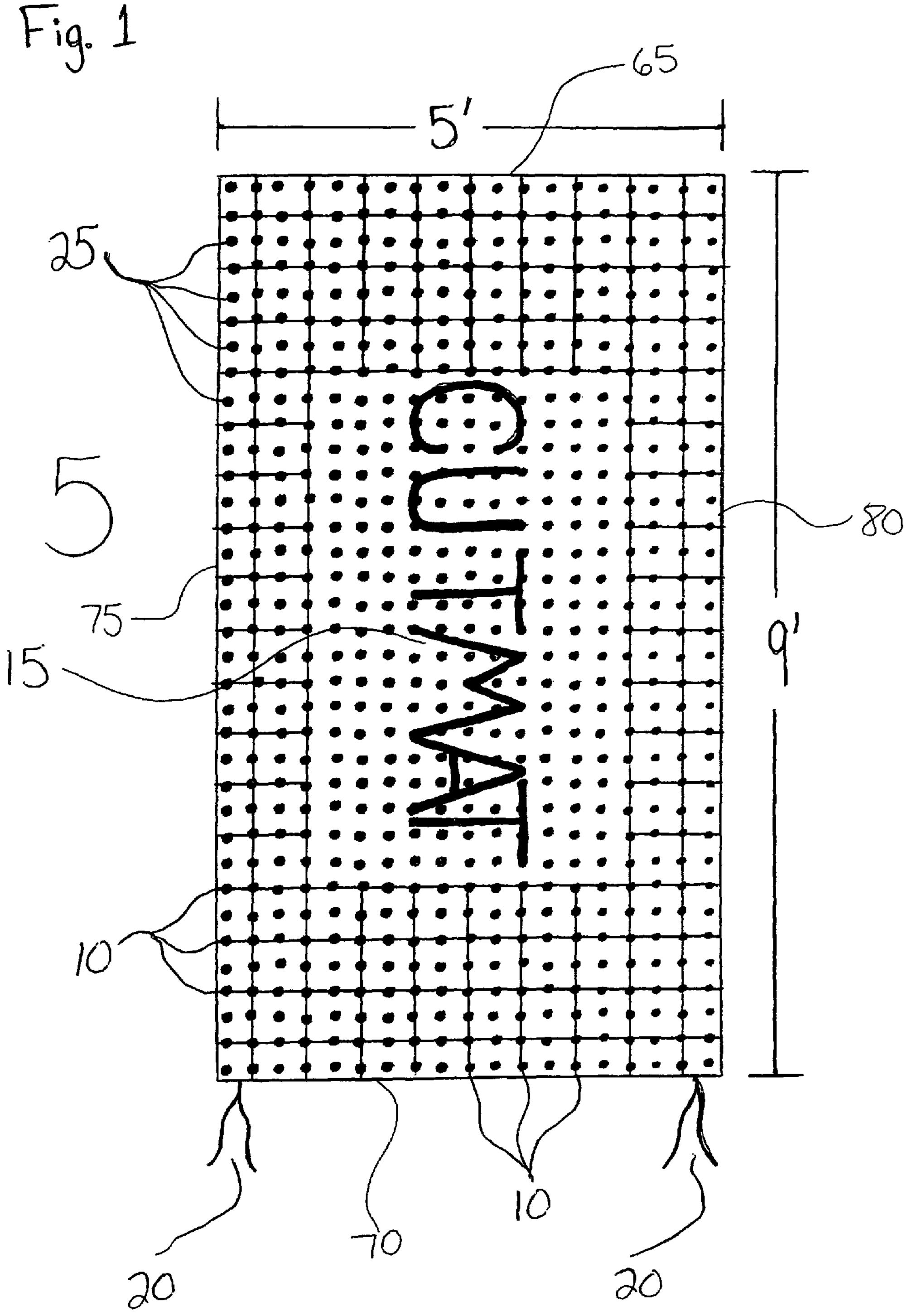
FIG. 1 is a top view of the present invention shown with tie strings, row markings and replaceable support pegs in a grid pattern of predetermined spacing. Also shown with logo area of the mat.

PEG-A being a one piece with a mat grove where the mat would fit.

PEG-B being two pieces with a self locking male bottom section and a female top section.

FIG. 3 is a top view perspective of the present invention shown with tie strings, row markings and replaceable support pegs. Also shown with logo area of the mat.

FIG. 4 is a portion of a side view of the present invention shown with replaceable support pegs A and replaceable support pegs B secured through the top and bottom surfaces of the mat. Also shown is the area between rows of replaceable support pegs which is the cutting channels.

DESCRIPTION OF THE PREFERRED EMBODIMENT

The description set forth below in connection with the appended drawings is intended as a description of presently-preferred embodiments of the invention and is not intended to represent the only forms in which the present invention may be constructed and/or utilized. However, it is to be understood that the same or equivalent functions and sequences described herein may be accomplished by different embodiments that are also intended to be encompassed within the spirit and scope of the invention.

FIG. 1 through FIG. 4 shows the cut mat 5 of the present invention. The cut mat 5 has a top surface 30, a bottom surface 35 and can be made in different thicknesses and of different materials including but not limited to rubber, silicone, vinyl, plastic, urethane, canvas and/or cloth. The row markings 10 are printed on the mat top surface 30, every other row to help user differentiate between rows and to help align cutting channels 55. Said row markings 10 would be printed along the outer perimeter of said cut mat 5 allowing center section to be used as a logo area 15 to customize said cut mat 5 with a company or product name. The cut mat 5, when rolled out on a flat surface, has an area that is marginally larger than a standard four foot by eight foot wood sheet thus allowing row markings 10 to be visible around the entire perimeter of the wood sheet when said wood sheet is laid flat and centered upon the rows of replaceable support pegs 25. These replaceable support pegs 25 are secured to the cut mat 5 through mat holes 60. The replaceable support pegs 25 are secured to the cut mat 5 in a grid pattern of predetermined spacing with the top section 40 of the replaceable support pegs 25 extending above mat top surface 30 at a predetermined height. The area just above the mat top surface 30 and between the rows of replaceable support pegs 25 are the cutting channels 55.

When a wood sheet is laid flat upon the top section 40 of the replaceable support pegs 25, a power circular saw blade can be set at a predetermined depth as to cut through said wood sheet, but not make contact with the mat top surface 30. Aligning cut marks of said wood sheet directly over cutting channels 55 would allow said wood sheet to be cut without contacting replaceable support pegs 25. The close proximity of the replaceable support pegs 25 within the grid pattern system allows the user to put their full weight upon said wood sheet to immobilize said wood sheet while cutting without fear of binding or stopping the blade of said circular saw thus creating a safer way to cut said wood sheeting. The cut mat 5 can be secured by using tie strings and/or straps 20 around the circumference of rolled up cut mat 5 for transportation or storage when not in use.

What is claimed is:

1. An apparatus for cutting a workpiece with said workpiece being placed on top of said apparatus and said apparatus comprising:

a mat including a top and bottom surface which has a pliable material with through holes being both longitudinally and latitudinally aligned in an array of columns and rows, wherein said mat has differentiating measurement markings alternating between said rows and columns being on top of said top surface;

a plurality of attachable and detachable support pegs extending above the mat with said support pegs comprising: a bottom section with an elongated member having fixing portions, a top section including distal and proximal ends with said proximal end being larger than said bottom section and attachable and detachable to said fixing portions inside of an interior recess of said top section and wherein said mat and said plurality of support pegs are attached to through said mat holes providing support for said workpiece.

2. The apparatus according to claim 1 further comprising tie strings.

3. The apparatus according to claim 1 further comprising straps.

4. The apparatus according to claim 1 wherein said tie strings are attached to edges of the mat.

5. The apparatus according to claim 1 wherein said straps are attached to edges of the mat.

6. A method for cutting a workpiece with said method comprising the steps of;

having said workpiece being placed on top of said apparatus; the step of using a cutting instrument on said workpiece;

the step of using a mat including a top and bottom surface which has a pliable material with through holes being both longitudinally and latitudinally aligned in an array of columns and rows, wherein said mat has differentiating measurement markings alternating between said rows and columns being on top of said top surface;

the step of using a plurality of attachable and detachable support pegs extending above the mat with said support pegs comprising: a bottom section with an elongated member having fixing portions, a top section including distal and proximal ends with said proximal end being larger than said bottom section and attachable and detachable to said fixing portions inside of an interior recess of said top section and wherein said mat and said plurality of support pegs are attached to through said mat holes providing support for said workpiece.

7. The method according to claim 6 further comprising a step of having tie strings attached to edges of the mat and rolling up the mat for storage.

8. The method according to claim 6 further comprising a step of having straps attached to edges of the mat and rolling up the mat for storage.

* * * * *